(12) United States Patent
Schulze

(10) Patent No.: US 8,936,220 B2
(45) Date of Patent: Jan. 20, 2015

(54) INTEGRATED SHAPED PLASTIC EXHAUST SYSTEM FOR FUEL CELL VEHICLES

(75) Inventor: Jörg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 419 days.

(21) Appl. No.: 13/315,173

(22) Filed: Dec. 8, 2011

(65) Prior Publication Data

US 2013/0146169 A1    Jun. 13, 2013

(51) Int. Cl.
*F16L 3/00* (2006.01)

(52) U.S. Cl.
USPC .......................................... 248/68.1; 180/309

(58) Field of Classification Search
CPC ... Y02E 60/50; H01M 2250/20; Y02T 90/32; B60K 13/04; F16L 3/223
USPC ............. 180/309, 65.22, 68.3, 65.31; 248/73, 248/65, 68.1, 74.2; 429/456, 428, 423, 513; 60/272, 298
See application file for complete search history.

(56) References Cited

U.S. PATENT DOCUMENTS

| | | | | |
|---|---|---|---|---|
| 3,084,971 A * | 4/1963 | Schilberg | ..................... | 296/35.1 |
| 4,874,908 A * | 10/1989 | Johansson | ................... | 174/72 A |
| 5,002,243 A * | 3/1991 | Kraus et al. | .................. | 248/68.1 |
| 5,002,244 A * | 3/1991 | Holbury et al. | ............. | 248/68.1 |
| 5,102,187 A * | 4/1992 | Harasaki | ........................ | 296/204 |
| 5,195,607 A * | 3/1993 | Shimada et al. | ............. | 180/296 |
| 5,839,473 A * | 11/1998 | Caine et al. | ................... | 137/888 |
| 6,036,145 A * | 3/2000 | Calabrese et al. | ........... | 248/68.1 |
| 6,050,284 A * | 4/2000 | Caine et al. | .................... | 181/277 |
| 6,142,427 A * | 11/2000 | Kogure et al. | ................... | 248/65 |
| 6,348,278 B1 * | 2/2002 | LaPierre et al. | .............. | 429/411 |
| 7,559,578 B2 * | 7/2009 | van Leeve et al. | ............ | 280/781 |
| 8,356,778 B2 * | 1/2013 | Birli et al. | ........................ | 248/73 |
| 8,361,675 B2 * | 1/2013 | Jufuku et al. | ................. | 429/512 |
| 8,432,658 B1 * | 4/2013 | Heise | ............................. | 361/217 |
| 8,505,672 B2 * | 8/2013 | Schulze | ........................ | 180/309 |
| 8,607,906 B2 * | 12/2013 | Katano | ...................... | 180/65.31 |
| 8,668,174 B2 * | 3/2014 | Kato | ............................ | 248/74.2 |
| 8,684,321 B2 * | 4/2014 | Shirakabe et al. | ........... | 248/74.1 |
| 2001/0047897 A1 * | 12/2001 | Steenackers et al. | ........ | 180/89.2 |
| 2003/0145583 A1 * | 8/2003 | Tanaka et al. | .................. | 60/298 |
| 2004/0262059 A1 * | 12/2004 | Uozumi | ....................... | 180/65.3 |
| 2005/0127248 A1 * | 6/2005 | Suzuki et al. | ................. | 248/68.1 |
| 2006/0157966 A1 * | 7/2006 | Leeve et al. | .................... | 280/788 |
| 2007/0157598 A1 * | 7/2007 | Atanas et al. | .................. | 60/272 |
| 2008/0141667 A1 * | 6/2008 | Winter et al. | ................... | 60/324 |
| 2009/0032318 A1 * | 2/2009 | Ishitoya | ...................... | 180/65.3 |
| 2009/0166489 A1 * | 7/2009 | Volchko | ..................... | 248/205.1 |
| 2010/0078966 A1 * | 4/2010 | Onoda et al. | ............. | 296/193.07 |

(Continued)

OTHER PUBLICATIONS

Schulze, Jorg, Underbody Integrated Exhaust Path for Fuel Cell Vehicles, U.S. Appl. No. 13/214,777, filed Nov. 22, 2011.

*Primary Examiner* — Brodie Follman
(74) *Attorney, Agent, or Firm* — John A. Miller; Miller IP Group, PLC

(57) ABSTRACT

A shaped plastic exhaust system for a fuel cell vehicle. In one embodiment, the exhaust system employs integrally molded bundle clips that support vehicle brake lines and/or a fuel supply line. An exhaust flow section can be formed into any suitable shape for a particular vehicle design, including a flat rectangular shape giving the exhaust system a low profile. The integral bundle clips can be provided every so often along the exhaust flow section, or can extend the complete length of the exhaust flow section.

19 Claims, 2 Drawing Sheets

(56) References Cited

U.S. PATENT DOCUMENTS

| | | | |
|---|---|---|---|
| 2010/0297512 A1* | 11/2010 | Shinoda et al. | 429/423 |
| 2010/0297514 A1* | 11/2010 | Jufuku et al. | 429/428 |
| 2011/0079455 A1* | 4/2011 | Katano | 180/65.31 |
| 2012/0205501 A1* | 8/2012 | Arzate-Engels | 248/68.1 |
| 2013/0048408 A1* | 2/2013 | Schulze | 180/309 |
| 2013/0120893 A1* | 5/2013 | Heise | 361/217 |
| 2013/0146169 A1* | 6/2013 | Schulze | 138/106 |

* cited by examiner

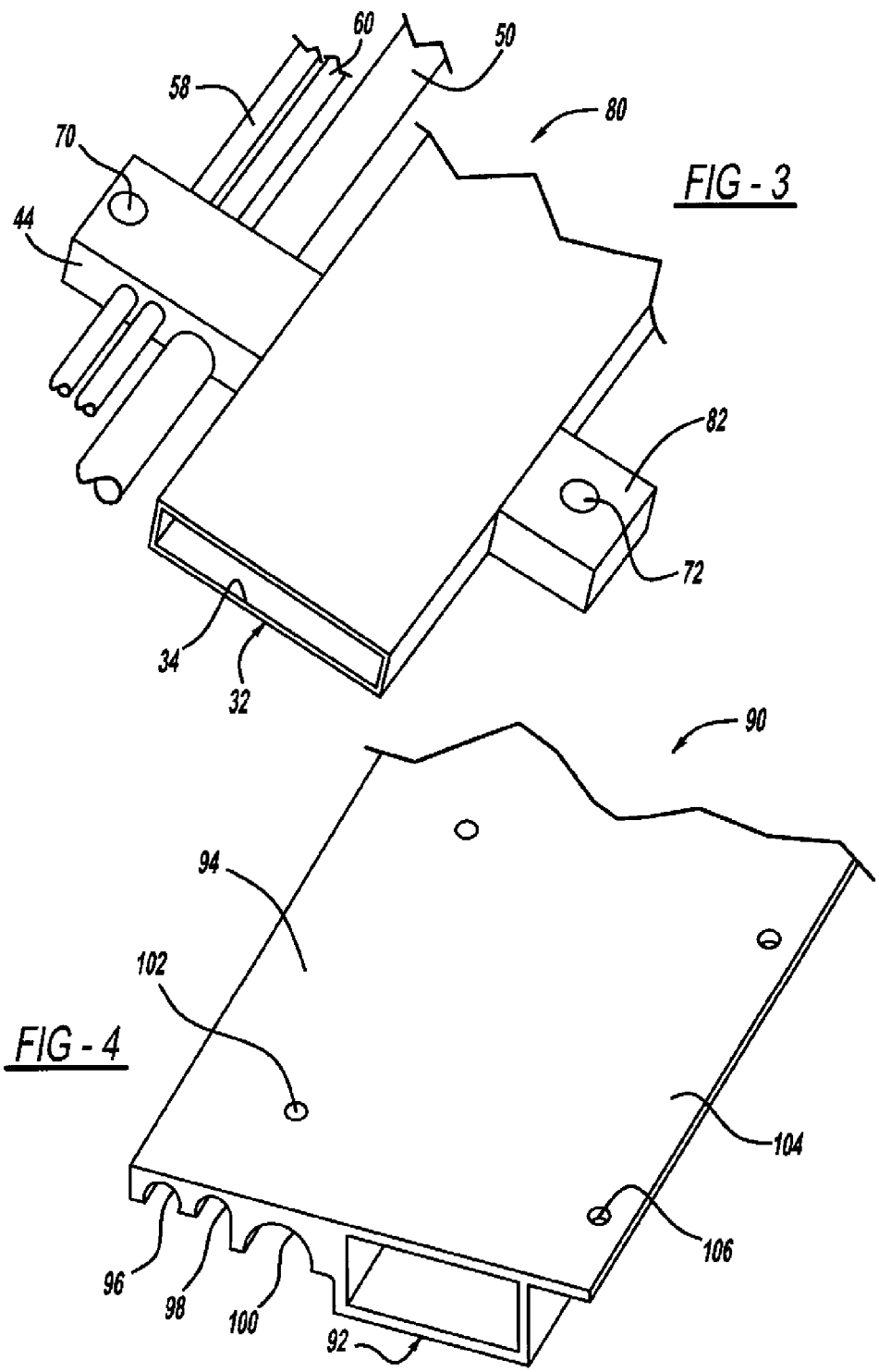

INTEGRATED SHAPED PLASTIC EXHAUST SYSTEM FOR FUEL CELL VEHICLES

BACKGROUND OF THE INVENTION

1. Field of the Invention

This invention relates generally to a shaped plastic exhaust system for a fuel cell vehicle and, more particularly, to a shaped plastic exhaust system for a fuel cell vehicle that includes integrally molded bundle clips for supporting various vehicle lines, such as brake lines and fuel supply lines.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines. Fuel cell vehicles are expected to rapidly increase in popularity in the near future in the automotive marketplace.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. In one known type of fuel cell system, the hydrogen gas fuel is injected into the anode side of the fuel cell stack by one or more injectors. The injector controls the amount of injected fuel for a particular stack current density based on pulse width modulation (PWM) control signal that controls the opening and closing of the injector.

Typically, hydrogen gas for the fuel cell system is stored in a high pressure storage tank system including one or more interconnected pressure vessels on the vehicle to provide the hydrogen gas necessary for the fuel cell stack. The pressure within the vessels can be 700 bar or more. In one known design, the pressure vessels include an inner plastic liner that provides a gas tight seal for the hydrogen gas, and an outer carbon fiber composite layer that provides the structural integrity of the vessel.

Unlike the exhaust of an internal combustion engine, the exhaust from a fuel cell stack on a vehicle is warm, but not hot, and thus the exhaust system of a fuel cell vehicle does not need to be configured of metal components. Therefore, it has been proposed in the art to configure the exhaust system of a fuel cell vehicle using plastic components to reduce the weight of the vehicle, reduce vehicle cost, etc. Further, because the exhaust from the fuel cell stack is warm, the exhaust pipes can be closely mounted to the underbody of the vehicle chasse without concern for damaging vehicle parts or heating the passenger compartment of the vehicle, as opposed to internal combustion engines which require a space between the exhaust gas line and the vehicle underbody. A representative plastic exhaust system for a fuel cell vehicle is disclosed in U.S. patent application Ser. No. 13/214,777, titled Underbody Integrated Exhaust Path for Fuel Cell Vehicles, filed Aug. 27, 2011, assigned to the assignee of this application, and herein incorporated by reference.

SUMMARY OF THE INVENTION

In accordance with the teachings of the present invention, a shaped plastic exhaust system for a fuel cell vehicle is disclosed. In one embodiment, the exhaust system includes integrally molded bundle clips that support vehicle brake lines and/or a fuel supply line. An exhaust flow section can be formed into any suitable shape for a particular vehicle design, including a flat rectangular shape giving the exhaust system a low profile. The integral bundle clips can be provided every so often along the exhaust flow section, or can extend the entire length of the exhaust flow section.

Additional features of the present invention will become apparent from the following description and appended claims, taken in conjunction with the accompanying drawings.

BRIEF DESCRIPTION OF THE DRAWINGS

FIG. 3 is a broken-away perspective view of a plastic vehicle exhaust system including an exhaust flow section and integral bundle clips at one side of the exhaust section; and FIG. 4 is a broken-away perspective view of a plastic vehicle exhaust system including an exhaust flow section and an integral bundle clip extending the length of the exhaust section along one side.

DETAILED DESCRIPTION OF THE EMBODIMENTS

The following discussion of the embodiments of the invention directed to a plastic vehicle exhaust system including integral bundle clips is merely exemplary in nature, and is in no way intended to limit the invention or its applications or uses. For example, the plastic exhaust system of the present invention is specifically described for a fuel cell vehicle. However, as will be appreciated by those skilled in the art, the plastic exhaust system may have application for other vehicles or other machines.

Figure 1:
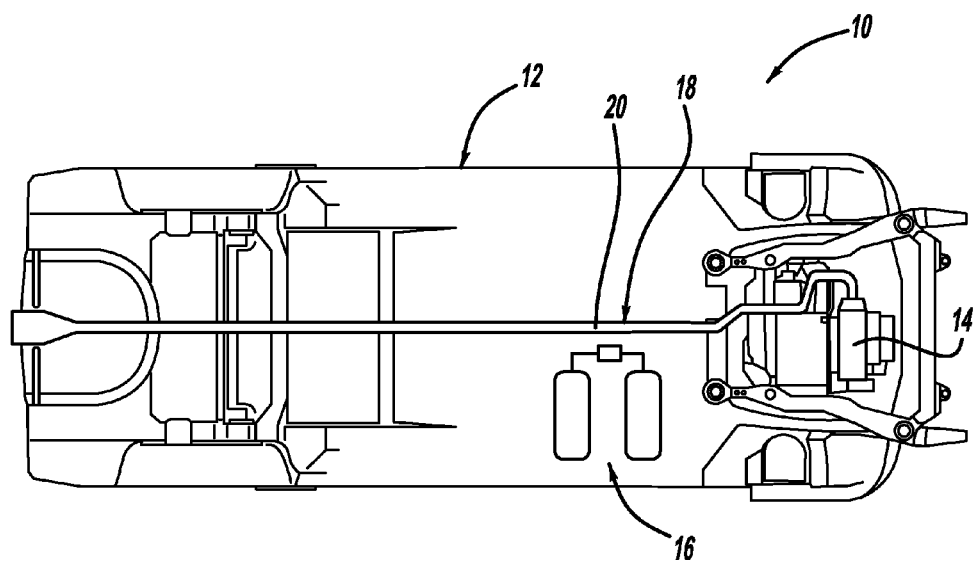
FIG. 1 is an illustration of the underside of a vehicle chasse of a vehicle showing a plastic vehicle exhaust system.

FIG. 1 is a bottom view of a fuel cell vehicle 10 showing a vehicle chasse 12. The vehicle 10 includes a fuel cell stack 14 that receives hydrogen gas fuel from a hydrogen gas storage tank system 16. The fuel cell stack 14 generates a fuel cell stack exhaust that includes water vapor, liquid water, air, low levels of waste hydrogen gas and other trace elements. An exhaust gas system 18 including an exhaust flow line 20 is coupled to the stack 14 to direct the stack exhaust to the environment in a manner that is well understood by those skilled in the art. As will be discussed in detail below, the present invention proposes a low profile plastic exhaust system that can be used as the exhaust system 18 and that includes an exhaust flow section, and integral fastening or bundle clips for holding brake lines and/or a fuel cell supply line, and for mounting the exhaust system to the vehicle chasse 12.

Figure 2:
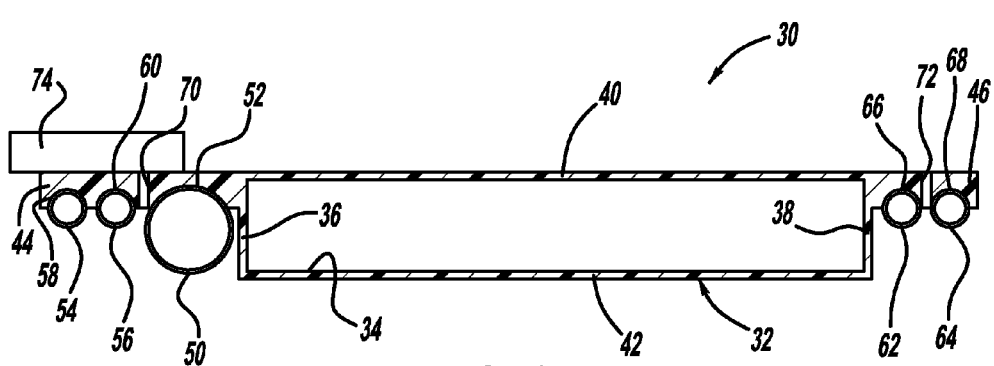
FIG. 2 is a cross-sectional view of a plastic vehicle exhaust system showing an exhaust flow section and integral bundle clips at both sides of the exhaust section.

FIG. 2 is a cross-sectional view of a plastic vehicle exhaust system 30 that can replace the exhaust system 18 on the vehicle 10. The exhaust system 30 is a single shaped piece plastic molded member formed by any suitable plastic fabrication technique, such as blow molding, injection molding, extrusion, etc. The exhaust system 30 can be made of any plastic suitable for the purposes discussed herein, such as a high density polyethylene. The exhaust system 30 includes an exhaust flow section 32 forming a channel 34 through which the exhaust, including air, liquid water, water vapor and low levels of hydrogen gas, flows after being emitted from the fuel cell stack 14 to direct the exhaust to the environment. In this non-limiting embodiment, the exhaust section 32 is formed so that the shape of the channel 34 is rectangular having opposing side walls 36 and 38, a top wall 40 and a bottom wall 42, and has a general flat profile. The dimensions of the exhaust flow section 32 can be any dimension suitable for the particular vehicle, such as a width between the walls 36 and 38 in the range of 15-20 cm and height between the walls 40 and 42 of about 5 cm.

As shown in FIG. 1, the exhaust system 30 would extend some distance along the length of the vehicle chasse 12 from the fuel cell stack 14 to the location where the exhaust gas is emitted into the environment. For this embodiment, the exhaust system 30 includes a number or series of spaced apart integral bundle clips 44 formed as part of the side wall 36 of the exhaust section 32, and a number of spaced apart integral bundle clips 46 formed as part of the side wall 38 of the exhaust section 32. The integral bundle clips 44 and 46 include a series of channels that accept various lines that also would extend some length along the vehicle chasse 12. In this non-limiting embodiment, a fuel supply line 50 is mounted in a semi-spherical channel 52 by a snap-fit engagement and brake lines 54 and 56 are mounted in semi-spherical channels 58 and 60, respectively, by a snap-fit engagement in the bundle clip 44. Likewise, brake lines 62 and 64 are mounted within semi-spherical channels 66 and 68 by a snap-fit engagement in the bundle clip 46. For the configuration of the exhaust system 30, the bundle clips 44 and 46 accommodate both the front wheel brake lines and the rear wheel brake lines, although for most vehicle designs, only the brake lines for the rear wheels would need to be mounted to the exhaust system. The brake lines 54, 56, 62 and 64 will typically be made of a suitable metal, such as aluminum, and the fuel supply line 50 will typically be made of a suitable plastic.

The bundle clips 44 and 46 can have any suitable width for a particular vehicle application, such as 6-10 centimeters. Further, the number of the bundle clips 44 and 46 will vary from system to system depending on the length of the exhaust system 30 and may be positioned every 25 cm apart from each other along the flow section 32. Also, the bundle clips 44 and 46 can be staggered so that they are not directly across the flow section 32 from each other.

The exhaust system 30 is mounted to the under-side of the vehicle chasse 12 by mounting screws or bolts that can, for example, extend through a hole 70 in the bundle clip 44 and a hole 72 in the bundle clip 46. A vehicle underbody component 74 is shown as being representative of any suitable component on the under-side of the vehicle chasse 12 to which the exhaust system 30 can be mounted to in a suitable manner. Further, by making the bundle clips 44 and 46 integral with the exhaust section 32, the brake lines 58 and 60 and the fuel supply line 50 can be mounted to the integral bundle clips 44 and 46 prior to the exhaust system 30 being mounted to the vehicle chasse 12 in a fast and efficient manufacturing and assembly process.

FIG. 3 is a broken-away perspective view of a plastic vehicle exhaust system 80 for a fuel cell vehicle, similar to the exhaust system 30, where the same reference number identifies the same elements. In this embodiment, the configuration of the fuel cell system 80 is such that the front brake lines 62 and 64 do not need to be mounted to the exhaust system 80. Therefore, the bundle clip 46 is replaced with a series of spaced apart tabs 82 each only including the hole 72 for mounting the system 80 to the vehicle chasse 12.

In an alternate embodiment, instead of providing periodically occurring bundle clips every so often along the length of the exhaust flow section 32, the bundle clips can be one bundle clip that extends the entire length, or at least partial length, of the exhaust section 32. This embodiment is shown in FIG. 4 by a plastic vehicle exhaust system 90 including an exhaust flow section 92 similar to the exhaust flow section 32. In this embodiment, the system 90 includes an integral bundle clip 94 integral to one side of the exhaust section 92 that extends the length of the exhaust section 92 and includes semi-spherical channels 96 and 98 for supporting the rear brake lines and a larger semi-spherical channel 100 for supporting the fuel supply line. Holes 102 are provided every so often along the bundle clip 94 between the channels 98 and 100 to mount the fuel cell system 90 to the under-side of the vehicle chasse 12. Further, an integral flange 104 extends from an opposite side wall of the exhaust section 92 and includes holes 106 for accepting bolts to further mount the system 90 to the underside of the vehicle chasse 12. If the exhaust system 90 is designed to support the brake lines for both the front and rear wheels, then the flange 104 can be replaced with an integral bundle clip similar to the embodiment for the exhaust system 30, but that extends along the length of the flow section 92.

The present invention contemplates any desirable configuration of a shaped plastic vehicle exhaust system. The exhaust system may or may not have integral bundle clips, where the bundle clips support any lines, hoses, pipes, wires, etc. The embodiments discussed above are merely representative of some of those types of designs. For example, other embodiments may be a hybrid of the embodiments discussed above where the bundle clips on one side of the flow section are spaced apart and the bundle clip or flange on the other side of the flow section extends the length, or partial length, of the flow section. Also, the flow section can have any shape for a particular vehicle, where a flat profile may be preferred. Further, the bundle clips do not have to be integral with the exhaust system, but that configuration may be preferred.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An exhaust system for a vehicle, said vehicle including a power source that generates an exhaust, said system comprising an exhaust flow section defining a channel through which the exhaust from the power source travels, said exhaust system being a shaped single piece plastic system, further comprising at least one bundle clip mounted to one side of the exhaust flow section, said bundle clip including at least one channel operable to accept a vehicle line, wherein the exhaust section and the bundle clip are integral with each other as part of the single piece plastic system.

2. The exhaust system according to claim 1 wherein the power source is a fuel cell stack and the exhaust includes water vapor, air and hydrogen.

3. The exhaust system according to claim 1 wherein the at least one bundle clip is a plurality of bundle clips spaced apart along a length of the one side of the exhaust section.

4. The exhaust system according to claim 1 wherein the at least one bundle clip is an elongated bundle clip that extends along most of or an entire length of the one side of the exhaust section.

5. The exhaust system according to claim 1 wherein the at least one channel is a plurality of channels where a first one of the channels accepts a fuel supply line and a second and third one of the channels accept vehicle brake lines.

6. The exhaust system according to claim 1 further comprising at least one hole extending through the at least one bundle clip and being operable to accept a bolt or screw for mounting the exhaust system to an under-side of the vehicle.

7. The exhaust system according to claim 1 wherein the at least one bundle clip includes a plurality of bundle clips mounted to an opposite side wall of the exhaust flow section and all including a channel for accepting a vehicle line, said plurality of bundle clips being integral as part of the single piece plastic system.

8. The exhaust system according to claim 1 further comprising a flange extending from an opposite side of the exhaust flow section from the at least one bundle clip, said flange including at least one hole for accepting a mounting bolt or screw for mounting the exhaust system to the vehicle, said flange being integral as part of the single piece plastic system.

9. The exhaust system according to claim 1 wherein the at least one channel is a semi-spherical channel operable to support the vehicle line in a snap-fit engagement.

10. The exhaust system according to claim 1 wherein the exhaust flow section is a rectangular shaped exhaust flow section having a relatively flat profile where a width of the exhaust flow section is greater than a height of the exhaust flow section.

11. An exhaust system for a vehicle, said vehicle including a fuel cell stack that generates an exhaust, said system comprising:
    an exhaust flow section defining a channel through which the exhaust from the fuel cell stack travels, said exhaust flow section being a rectangular shaped exhaust section having a relatively flat profile where a width of the exhaust section is greater than a height of the exhaust section; and
    at least one bundle clip mounted to one side of the exhaust section, said bundle clip including a first semi-spherical channel that accepts a fuel supply line and second and third semi-spherical channels that accept vehicle brake lines, said exhaust system being a single piece plastic system where the exhaust section and the bundle clip are part of the single piece.

12. The exhaust system according to claim 11 wherein the at least one bundle clip is a plurality of bundle clips spaced apart along a length of the one side of the exhaust section.

13. The exhaust system according to claim 11 wherein the at least one bundle clip is an elongated bundle clip that extends along most of or an entire length of the one side of the exhaust section.

14. The exhaust system according to claim 11 further comprising at least one hole extending through the at least one bundle clip and being operable to accept a bolt or screw for mounting the exhaust system to an under-side of the vehicle.

15. The exhaust system according to claim 11 wherein the at least one bundle clip includes a plurality of bundle clips mounted to an opposite side wall of the exhaust flow section all including at least one semi-spherical channel for accepting a vehicle line, said plurality of bundle clips being integral as part of the single piece plastic system.

16. The exhaust system according to claim 11 further comprising a flange extending from an opposite side of the exhaust flow section from the at least one bundle clip, said flange including at least one hole for accepting a mounting bolt or screw for mounting the exhaust system to the vehicle, said flange being integral as part of the single piece plastic system.

17. An exhaust system for a vehicle, said vehicle including a fuel cell stack that generates an exhaust, said system comprising:
    an exhaust flow section defining a channel through which the exhaust from the fuel cell stack travels, said exhaust flow section being a rectangular shaped exhaust section having a relatively flat profile where a width of the exhaust section is greater than a height of the exhaust section; and
    a plurality of bundle clips mounted to one side of the exhaust flow section and being spaced apart from each other, each bundle clip including a first semi-spherical channel that accepts a fuel supply line and second and third semi-spherical channels that accept vehicle brake lines, each bundle clip also including a hole extending through the bundle clip and being operable to accept a bolt or screw for mounting the exhaust system to an under-side of the vehicle, said exhaust system being a single piece plastic system where the exhaust section and the bundle clips are part of the single piece.

18. The exhaust system according to claim 17 further comprising a plurality of bundle clips mounted to an opposite side wall of the exhaust flow section, each of these plurality of bundle clips including a fourth and fifth semi-spherical channel also accepting vehicle brake lines, each of these bundle clips also including a hole extending through the bundle clip and being operable to accept a bolt or screw for mounting the exhaust system to the under-side of the vehicle, and these plurality of bundle clips being integral as part of the single piece plastic system.

19. The exhaust system according to claim 17 further comprising a flange extending from an opposite side wall of the exhaust flow section from the plurality of bundle clips, said flange including at least one hole for accepting a mounting bolt or screw for mounting the exhaust system to the under-side of the vehicle, said flange being integral as part of the single piece plastic system.

* * * * *